United States Patent
Pfeiffer et al.

(10) Patent No.: US 10,101,193 B2
(45) Date of Patent: Oct. 16, 2018

(54) APPARATUS AND METHOD FOR DETERMINING A LEVEL OF A FLUID SURFACE IN A FLUID CONTAINER

(71) Applicant: Continental Automotive GmbH, Hannover (DE)

(72) Inventors: Karl-Friedrich Pfeiffer, Erlangen (DE); Claus Webber, Zirndorf (DE); Henning Grotevent, Nuremberg (DE); Wighard Jaeger, Spardorf (DE)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 15/113,977

(22) PCT Filed: May 26, 2015

(86) PCT No.: PCT/EP2015/061495
§ 371 (c)(1),
(2) Date: Jul. 25, 2016

(87) PCT Pub. No.: WO2015/181107
PCT Pub. Date: Dec. 3, 2015

(65) Prior Publication Data
US 2017/0082479 A1    Mar. 23, 2017

(30) Foreign Application Priority Data
May 27, 2014    (DE) .................. 10 2014 210 077

(51) Int. Cl.
*G01F 23/296*    (2006.01)
*G01F 25/00*    (2006.01)

(52) U.S. Cl.
CPC ...... *G01F 23/2962* (2013.01); *G01F 23/2968* (2013.01); *G01F 25/0061* (2013.01)

(58) Field of Classification Search
CPC ............ G01F 23/2962; G01F 23/2968; G01F 25/0061
See application file for complete search history.

(56) References Cited

U.S. PATENT DOCUMENTS

| 4,337,661 A | 7/1982 | Kretz et al. ..................... 73/628 |
| 5,095,748 A | 3/1992 | Gregory et al. ............. 73/290 V |

(Continued)

FOREIGN PATENT DOCUMENTS

| DE | 7030851 U | 4/1971 | .......... G01F 23/296 |
| DE | 3706453 A1 | 9/1988 | .......... G01F 23/292 |

(Continued)

OTHER PUBLICATIONS

German Office Action, Application No. 102014210080.1, 5 pages, dated Dec. 9, 2014.

(Continued)

*Primary Examiner* — Harshad R Patel
*Assistant Examiner* — Punam Roy
(74) *Attorney, Agent, or Firm* — Slayden Grubert Beard PLLC

(57) ABSTRACT

A fluid level sensor may include a first sound transducer, a second sound transducer, a reference element, a first deflection element, and a control unit. The reference element may be disposed at a predetermined distance from the second sound transducer and arranged in a fluid space of the fluid container. The first deflection element may be arranged in the fluid space to deflect the second sound signals by a first predetermined angle toward the fluid surface. The control unit may establish a speed of sound within a fluid in the fluid space based at least in part on the second sound signals and establish the level of the fluid surface over a base portion of (Continued)

the fluid container based at least in part on the first sound signals, the second sound signals, and the speed of sound within the fluid.

15 Claims, 4 Drawing Sheets

(56) References Cited

U.S. PATENT DOCUMENTS

| | | | |
|---|---|---|---|
| 5,693,881 A | 12/1997 | Sitachitt et al. | 73/290 V |
| 5,793,705 A | 8/1998 | Gazis et al. | 367/98 |
| 6,786,090 B2 | 9/2004 | Benghezal et al. | 73/290 V |
| 8,037,752 B2 * | 10/2011 | Zachmann | G01F 23/2962 73/290 V |
| 9,605,990 B2 | 3/2017 | Enomoto et al. | |
| 2003/0140696 A1 | 7/2003 | Benghezal et al. | 73/290 V |
| 2004/0007061 A1 | 1/2004 | Forgue | 73/290 V |
| 2005/0284217 A1 | 12/2005 | Miyagawa et al. | 73/290 V |
| 2010/0018309 A1 | 1/2010 | Marcovecchio et al. | 73/290 V |
| 2012/0118059 A1 | 5/2012 | Reimer et al. | 73/290 V |
| 2014/0345377 A1 | 11/2014 | Jäger et al. | 73/290 V |
| 2016/0216148 A1 * | 7/2016 | Stangl | G01N 29/221 |
| 2016/0216149 A1 | 7/2016 | Bauer et al. | 60/301 |
| 2016/0363473 A1 * | 12/2016 | Jung | F01N 3/2066 |
| 2017/0122789 A1 * | 5/2017 | Borsoi | F01N 3/2066 |
| 2017/0363459 A1 * | 12/2017 | Kim | G01F 23/2962 |

FOREIGN PATENT DOCUMENTS

| | | | | |
|---|---|---|---|---|
| DE | 4025326 A1 | 11/1991 | | G01F 23/296 |
| DE | 4126063 A1 | 2/1992 | | G01F 23/28 |
| DE | 102006013263 A1 | 9/2007 | | G01N 29/024 |
| DE | 102007059853 A1 | 6/2009 | | G01F 23/296 |
| DE | 102011086774 A1 | 5/2013 | | F01N 3/10 |
| DE | 102011089685 A1 | 6/2013 | | G01F 23/296 |
| DE | 102012205640 A1 | 7/2013 | | G01F 23/296 |
| EP | 2633790 A1 | 9/2013 | | A47J 37/12 |
| GB | 1300160 A | 12/1972 | | G01F 23/296 |
| JP | 4254457 B2 | 4/2009 | | B60K 15/077 |
| JP | 06160155 A | 8/2014 | | G01B 17/00 |
| WO | 2015/181105 A1 | 12/2015 | | G01F 23/296 |
| WO | 2015/181107 A2 | 12/2015 | | G01F 25/00 |

OTHER PUBLICATIONS

German Office Action, Application No. 102014210077.1, 5 pages, dated Feb. 5, 2015.
International Search Report and Written Opinion, Application No. PCT/EP2015/061493, 14 pages, dated Oct. 5, 2015.
International Search Report and Written Opinion, Application No. PCT/EP2015/061495, 21 pages, Dec. 14, 2015.
U.S. Non-Final Office Action, Application No. 15/113,998, 24 pages, dated Feb. 20, 2018.
U.S. Final Office Action, U.S. Appl. No. 15/113,998, 18 pages, dated Jun. 11, 2018.
Korean Office Action, Application No. 2018026888748, 14 pages, dated Apr. 19, 2018.
Korean Office Action, Application No. 2018040260074, 11 pages, dated Jun. 15, 2018.

* cited by examiner

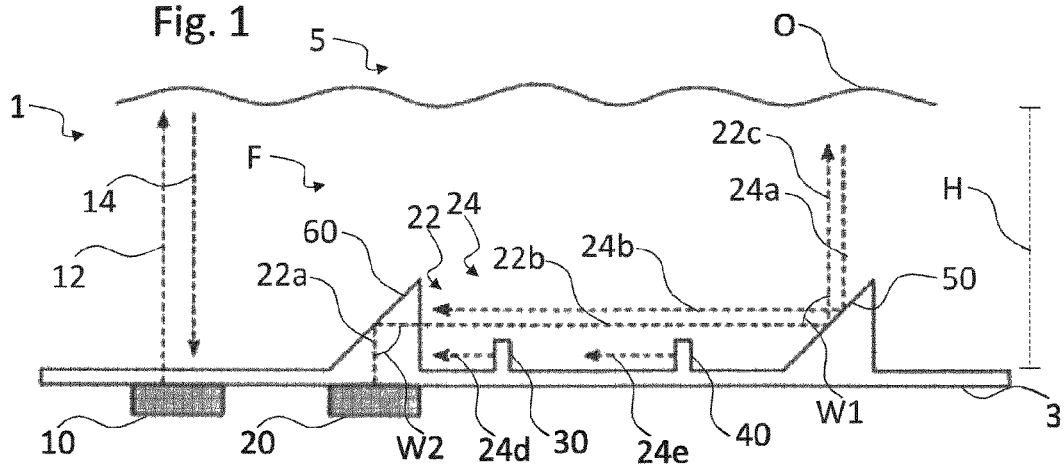
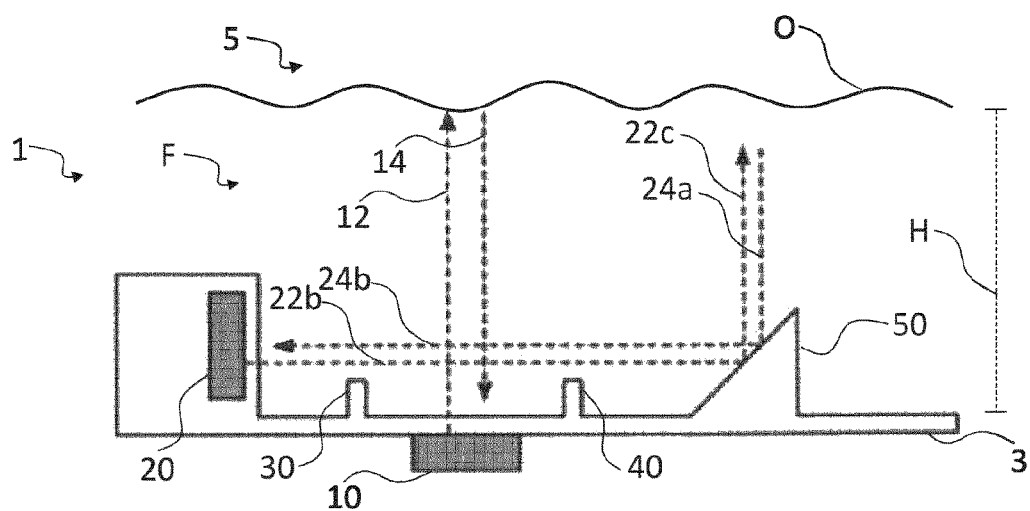

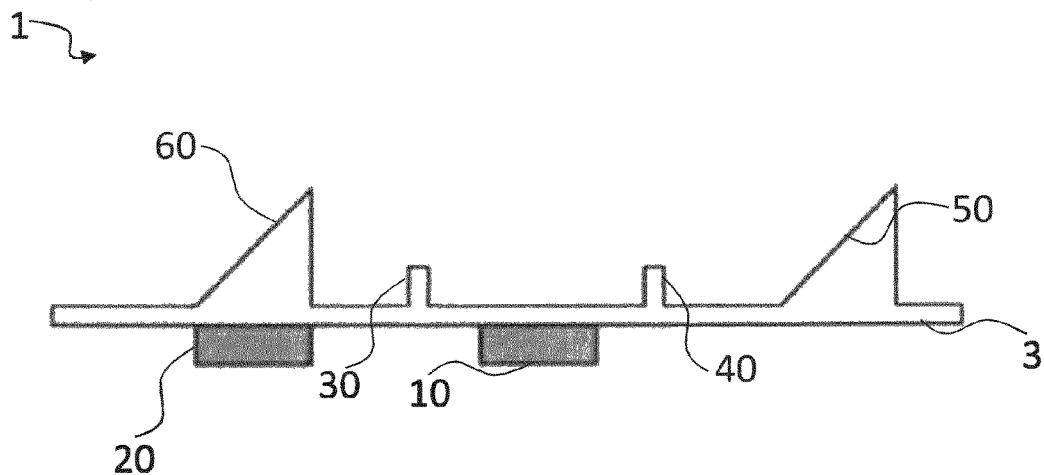
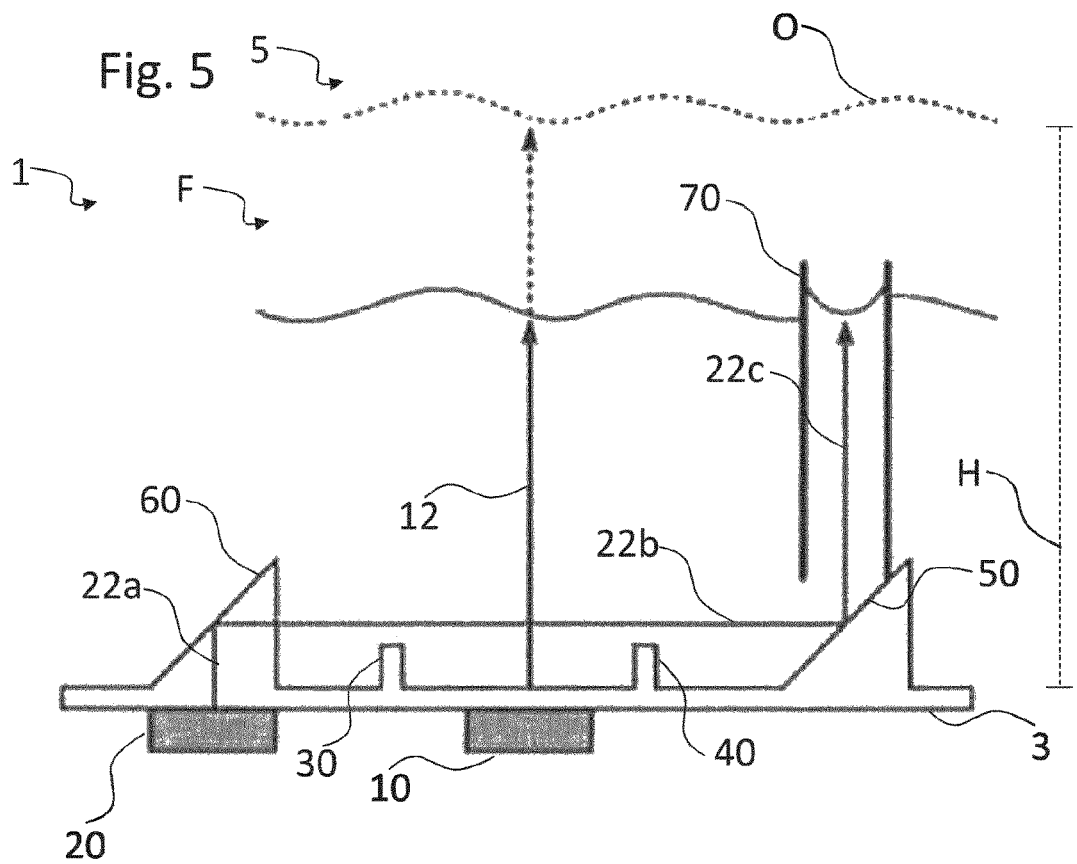

US 10,101,193 B2

APPARATUS AND METHOD FOR DETERMINING A LEVEL OF A FLUID SURFACE IN A FLUID CONTAINER

CROSS-REFERENCE TO RELATED APPLICATIONS

This application is a U.S. National Stage Application of International Application No. PCT/EP2015/061495 filed May 26, 2015, which designates the United States of America, and claims priority to DE Application No. 10 2014 210 077.1 filed May 27, 2014, the contents of which are hereby incorporated by reference in their entirety.

TECHNICAL FIELD

The present disclosure relates to fluid level sensors in general and an apparatus and a corresponding method for determining a level of a fluid surface in a fluid container.

BACKGROUND

An acoustic measuring apparatus can be used for determining a level of a fluid surface in a fluid container. A sound transducer of the acoustic measuring apparatus can operate both as sound generator and as sound receiver. For the purposes of determining the level of the fluid surface in the fluid container, it is possible to emit sound pulses into the fluid to be measured by means of the sound transducer. The sound pulses can be reflected by an interface of the fluid to a further medium. From the time-of-flight of the sound pulses, it is possible to draw conclusions about the level of the fluid surface in the fluid container.

SUMMARY

The present disclosure describes example apparati for determining a level of a fluid surface in a fluid container, which enable reliable determination of the level of the fluid surface, and a corresponding method for operating the apparatus.

In some embodiments, an apparatus for determining a level (H) of a fluid surface (O) in a fluid container (1) may include a first sound transducer, a second sound transducer, a reference element, a first deflection element, and a control unit. The first sound transducer (10) transmits and receives first sound signals (12, 14) in the direction of the fluid surface (O). The second sound transducer (20) for transmits and receives second sound signals (22, 24). The reference element (30, 40) has a predetermined distance from the second sound transducer (20) and is arranged in a fluid space (5) of the fluid container (1). The first deflection element (50) is arranged in the fluid space (5) for the purposes of deflecting the second sound signals (22, 24) by a first predetermined angle (W1) in the direction of the fluid surface (O). The control unit is configured to establish a speed of sound within a fluid (F) in the fluid space (5) dependent on the second sound signals (22, 24) and to establish the level (H) of the fluid surface (O) over a base portion (3) of the fluid container (1) dependent on the first sound signals (12, 14), the second sound signals (22, 24) and the speed of sound within the fluid (F).

Some embodiments include a second deflection element (60) is arranged in the fluid space (5) at a predetermined distance from the first deflection element (50) for the purposes of deflecting the second sound signals (22, 24) by a second predetermined angle (W2) in the direction of the first deflection element (50).

Some embodiments include a sound guiding tube (70) is arranged in the fluid space (5) and embodied to guide the second sound signals (22, 24), deflected by the first deflection element (50), along the longitudinal axis thereof in the direction of the fluid surface (O).

In some embodiments, the length of the sound guiding tube (70) is between 30 mm and 100 mm, in particular 60 mm.

In some embodiments, a diameter of the sound guiding tube (70) is between 5 mm and 15 mm, in particular 10 mm.

In some embodiments, a ratio of the length of the sound guiding tube (70) to the diameter of the sound guiding tube (70) is between 20:1 and 2:1, in particular 6:1.

Some embodiments include a reflector (90) is arranged at an inner wall (80) of the sound guiding tube (70) and with a predetermined reference distance from the base portion (3).

Some embodiments include a method for operating an apparatus as described above, wherein the level (H) of the fluid surface (O) above the base portion (3) of the fluid container (1) is established dependent on a signal quality of the first sound signals (12, 14) and the second sound signals (22, 24).

In some embodiments, the signal quality of the first sound signals (12, 14) and the second sound signals (22, 24) is established dependent on respective signal scattering of a plurality of sound signals (14, 24) recorded successively in time.

In some embodiments, the signal quality of the first sound signals (12, 14) and the second sound signals (22, 24) is established dependent on the respective signal power of the recorded sound signals (14, 24).

BRIEF DESCRIPTION OF THE DRAWINGS

Exemplary embodiments of the invention are explained below on the basis of the schematic drawings. In detail:

FIG. 1 shows a first exemplary embodiment of an apparatus for determining a level of a fluid surface in a fluid container, FIG. 3 shows a second exemplary embodiment of the apparatus for determining the level of the fluid surface in the fluid container, FIG. 4 shows a third exemplary embodiment of the apparatus for determining the level of the fluid surface in the fluid container, FIG. 5 shows a fourth exemplary embodiment of the apparatus for determining the level of the fluid surface in the fluid container.

Figure 2:
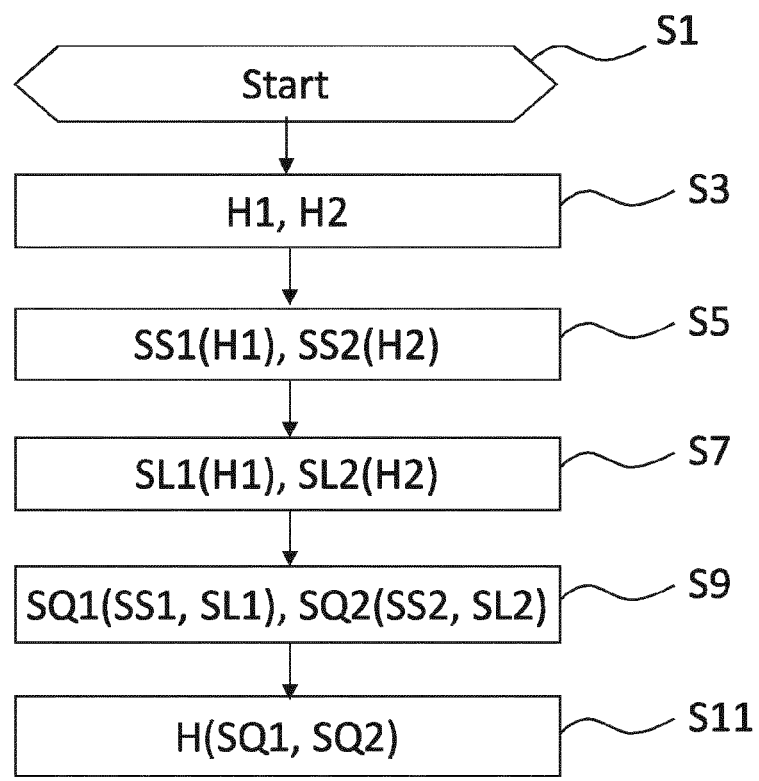
FIG. 2 shows a flowchart for operating the apparatus.

Elements of the same structure or function have been provided with the same reference signs in a figure-overarching manner.

DETAILED DESCRIPTION

Some embodiments include an apparatus for determining the level of a fluid surface in a fluid container. The apparatus comprises a first sound transducer for transmitting and receiving first sound signals in the direction of the fluid surface and a second sound transducer for transmitting and receiving second sound signals.

Moreover, the apparatus comprises a reference element which has a predetermined distance from the second sound transducer. The reference element is arranged in a fluid space of the fluid container.

Furthermore, the apparatus comprises a first deflection element which is arranged in the fluid space for the purposes of deflecting the second sound signals by a first predetermined angle in the direction of the fluid surface.

Moreover, the apparatus comprises a control unit which is embodied to establish a speed of sound within a fluid in the fluid space dependent on the second sound signals. Furthermore, the control unit is embodied to establish the level of the fluid surface over a base portion of the fluid container dependent on the first sound signals, the second sound signals and the speed of sound within the fluid.

Such an arrangement of the two sound transducers enables a precise determination of the level in the case of high fill levels and low fill levels of, e.g., less than 10%. Here, the precise determination of the level by the two sound transducers takes place independently of one another, for example.

To this end, the first sound transducer emits directly in the direction of the fluid surface. Establishing the speed of sound within the fluid enables a precise establishment of a time-of-flight of the signal. In order to be able to establish the speed of sound within the fluid even in the case of low fill levels, it was found to be advantageous to transmit and receive the second sound signals at a low level over the base portion of the fluid container. Hence, the second sound transducer serves primarily to establish the speed of sound within the fluid and secondarily for measuring a fill level.

An obstruction-free, direct propagation of the first sound signals is advantageous, particularly in the case of high fill levels, to keep a loss of signal power low. As a result, a particularly large measurement range is made possible. Furthermore, the deflection of the second sound signals in the direction of the fluid surface contributes to a second, redundant measurement of the level of the fluid surface being enabled and thus to a reliable and precise establishment.

By way of example, the first deflection element may be made of metal, ceramics, or glass. Thus, the first deflection element has a high acoustic impedance relative to the fluid in the fluid container. Hence, the reliable deflection of the sound signals is made possible. Moreover, this for example enables a robust arrangement of the deflection element as a free-standing component.

In some embodiments, the first deflection element includes a hollow body. Should the first deflection element be filled with air, a thermally caused expansion of the first deflection element may be reduced. Furthermore, this reduces material costs and the weight of the apparatus. Relative to the fluid in the fluid container, the first deflection element thus moreover has a low acoustic impedance. This embodiment may provide reliable deflection of the sound signals.

In some embodiments, the base portion of the fluid container has a protrusion to which the first deflection element is coupled. The protrusion projects into the fluid space. This enables a simple arrangement of the first deflection element.

In some embodiments, a second deflection element is arranged in the fluid space at a predetermined distance from the first deflection element for the purposes of deflecting the second sound signals by a second predetermined angle in the direction of the first deflection element.

Such embodiments render an arrangement of the two sound transducers with the same alignment, e.g., in the base portion of the fluid container, such that only one assembly step is required for affixing the two sound transducers. This contributes to a cost-effective and efficient production of the apparatus. Furthermore, in the case of installation space restrictions in particular, such embodiments may allow both sound transducers to be deployed at the base portion of the fluid container.

In some embodiments, the two sound transducers are embodied as piezo-transducers. An assembly of the two sound transducers is additionally made more difficult as a result of the small size thereof. The arrangement of the two sound transducers at the base portion of the fluid container may contribute to the assembly being carried out in a precise and efficient manner.

In this context, the base portion of the fluid container may be embodied separately from the sidewalls of the fluid container, which contributes to a simple assembly of the two sound transducers.

In some embodiments, the second deflection element has an analog embodiment to the first deflection element.

In some embodiments, a sound guiding tube is arranged in the fluid space. The sound guiding tube may guide the second sound signals, deflected by the first deflection element, along the longitudinal axis thereof in the direction of the fluid surface.

The sound guiding tube enables a reliable establishment of the level of the fluid surface, substantially independently of dynamics of the fluid surface. By way of example, the fluid surface has particularly pronounced dynamics as a result of the movement of the fluid container or as a result of an inclined position of the fluid container, which, without sound guidance, lead to scattering of the sound signals or an establishment of the level of the fluid surface which is otherwise afflicted by errors.

In some embodiments, the length of the sound guiding tube is between 30 mm and 100 mm. In particular, the length of the sound guiding tube is between 50 mm and 70 mm. In particular, the length of the sound guiding tube is 60 mm. Such dimensioning of the sound guiding tube enables a reliable and precise establishment of the level of the fluid surface. Here, the length of the sound guiding tube is, in particular, less than the level H of the fluid surface. The length of the sound guiding tube of at least 30 mm enables the sound guidance for low levels of the fluid surface, in which a precise establishment of the level is particularly important. Furthermore, a mechanical resilience of the sound guiding tube is ensured by the length of the sound guiding tube of at most 100 mm. Since the fluid freezes at low temperatures, mechanical resilience of the sound guiding tube is of particular importance.

In some embodiments, the diameter of the sound guiding tube is between 5 mm and 15 mm. In particular, the diameter of the sound guiding tube is 10 mm. Such dimensioning of the sound guiding tube enables a reliable and precise establishment of the level of the fluid surface. The diameter of the sound guiding tube of at least 5 mm enables reliable signal coupling, particularly in view of assembly tolerances, and so signal damping is kept low. Furthermore, a mechanical resilience of the sound guiding tube is ensured by the diameter of the sound guiding tube of at most 15 mm. Moreover, this ensures effective sound guidance through the sound guiding tube.

In some embodiments, a ratio of the length of the sound guiding tube to the diameter of the sound guiding tube is between 20:1 and 2:1. In particular, the ratio is between 12:1 and 4:1. In particular, the ratio is 6:1. Such dimensioning of the sound guiding tube contributes, in particular, to the mechanical resilience of the sound guiding tube.

In some embodiments, a reflector is arranged at an inner wall of the sound guiding tube. The reflector has a predetermined reference distance from the base portion. The reflector enables an establishment of a minimum level of the fluid surface.

In example methods for operating the apparatus, the level of the fluid surface over the base portion of the fluid container is established dependent on the signal quality of the first sound signals and the second sound signals. Weighting of the two sound signals by the signal quality thereof may contribute to a precise establishment of the level of the fluid surface.

In some embodiments, the signal quality of the first sound signals and the second sound signals is established dependent on respective signal scattering of a plurality of sound signals recorded successively in time.

In some embodiments, the signal quality of the first sound signals and the second sound signals is established dependent on the respective signal power of the recorded sound signals.

FIG. 1 shows a fluid container 1 with a base portion 3 and a fluid space 5, which is filled with a fluid F. By way of example, the fluid F is a liquid medium for reducing pollutants in exhaust gases, which may have a reduction means and/or a reduction means precursor, for example an aqueous urea solution.

For determining the level H of a fluid surface O in the fluid container 1, a first sound transducer 10 and a second sound transducer 20 are arranged at the base portion 3 of the fluid container 1. Here, the level H is defined as the distance between the fluid surface O and the base portion 3, measured in a neutral position of the fluid container 1, i.e. when there is no inclined position of the fluid container 1 present and the fluid surface O is parallel to the base portion 3. The level H can also be referred to as the fill level of the fluid container 1.

By way of example, the two sound transducers 10, 20 are embodied as piezo-transducers and coupled through a housing wall of the fluid container 1. By way of example, the housing wall is made of a plastic, such as so-called high density polyethylene (HDPE) such that the base portion 3 can be welded into the housing wall. Alternatively, the two sound transducers 10, 20 are adhesively bonded to the housing wall or mechanically pressed against the latter, possibly also with a further intermediate layer for compensating unevenness or roughness.

The first sound transducer 10 comprises a transmitter which emits first sound signals 12 in the direction of the fluid surface O. Here, the first sound transducer 10 is aligned in such a way that a main emission direction of the emitted first sound signals 12 is directed perpendicular to the base portion 3 toward the fluid surface O.

The fluid space 5 above the fluid F is filled with a further medium such as air, and so the emitted first sound signals 12 are reflected at a transition between the fluid surface O and the air, and reflected first sound signals 14 are incident on the first sound transducer 10. The reflected first sound signals 14 are recorded by a receiver of the first sound transducer 10. By way of example, a single piezo-element can be used as transmitter and receiver. Here, the alignment of the first sound transducer 10 likewise leads to a substantially perpendicular propagation of the first reflected sound signals 14 in relation to the base portion 3 of the fluid container 1. The propagation of the first sound signals 12, 14 is direct such that a power drop at obstacles is prevented and a determination of high fill levels of the fluid container 1 is thus made possible.

For the purposes of precisely determining the level H of the fluid surface O in the fluid container 1, a signal propagation speed of the first sound signals 12, 14 needs to be known. It is for this reason that a reference measurement is carried out by means of the second sound transducer 20. In order to be able to carry out this reference measurement even in the case of low levels H of the fluid surface O in the fluid container 1, in the case of fill levels of less than 10% of a maximum fill level, a sound propagation of the second sound signals 22, 24 takes place near the base portion 3 of the fluid container 1 in a manner substantially parallel to the base portion 3. Analogous to the first sound transducer 10, the second sound transducer 20 comprises a transmitter, which emits second sound signals 22, and a receiver, which records reflected second sound signals 24.

A first reference element 30 and a second reference element 40 are arranged in the fluid space 5. The two reference elements 30, 40 may be made of a material which comprises a metal. By way of example, the two reference elements 30, 40 are made from a metal piece and coupled with the base portion 3 of the fluid container 1 by staked plastic studs.

The two reference elements 30, 40 reflect at least part of the emitted second sound signal 22. The first reference element 30 has a predetermined first distance from the second sound transducer 20. The second reference element 40 has a predetermined second distance from the second sound transducer 20 and, in particular, a precisely known distance from the first reference element 30. By means of a control unit (not depicted in any more detail), a time-of-flight difference between the reflected second sound signals 24 is established in a manner dependent on the known distance between the two reference elements 30, 40, and a speed of sound in the fluid F in the fluid container 1 is established dependent on the time-of-flight difference. By way of example, a first time-of-flight of a reference sound signal 24d, reflected by the first reference element 30, and a second time-of-flight of a reference sound signal 24e, reflected by the second reference element 40, are established to establish the time-of-flight difference.

A first value H1 for the level H of the fluid surface O above the base portion 3 of the fluid container 1 is established in a manner dependent on the speed of sound within the fluid F and the first sound signals 12, 14.

In a first stage 22a of the emitted second sound signals 22, the main emission direction thereof is substantially perpendicular to the base portion 3 of the fluid container 1.

In order to establish the speed of sound, the emitted second sound signals 22 are deflected in such a way that they are directed substantially parallel to the base portion 3 onto the two reference elements 30, 40 in a second stage 22b. Furthermore, the second sound signals 24 reflected substantially parallel to the base portion 3 are deflected in a second stage 24b in such a way that they are directed substantially perpendicular to the second sound transducer 20 in a third stage 24c (not depicted in any more detail).

In order to ensure a reliable and precise establishment of the level H of the fluid surface O, the second sound signals 22, 24 are likewise used to establish the level H of the fluid surface O in addition to establishing the speed of sound, and so a second value H2 for the level H of the fluid surface is established in a manner dependent on the second sound signals 22, 24.

To this end, the emitted second sound signals 22 are once again deflected in such a way that they are directed substantially perpendicular to the base portion 3 onto the fluid surface O in a third stage 22c. Furthermore, sound signals 24 reflected substantially perpendicular to the base portion 3 in a first stage 24a are deflected in such a way that these are aligned substantially parallel to the base portion 3 in the second stage 24b of the reflected sound signals 24.

A first deflection element 50 is arranged in the fluid space 5 in order to deflect the second stage 22b of the emitted second sound signals 22 in the direction of the fluid surface O and in order to deflect the first stage 24a of the reflected second sound signals 24.

Furthermore, a second deflection element 60 is arranged in the fluid space 5 for deflecting the first stage 22a of the emitted second sound signals 22 in the direction of the first deflection element 50 and for deflecting the second stage 24b of the second reflected sound signals 24 in the direction of the second sound transducer 20.

The two deflection elements 50, 60 each include a 45° angle with the base portion 3 of the fluid container 1 such that the sound signals 22, 24 are each deflected by the predetermined angle W1, W2, by +90° or −90°.

By way of example, the two deflection elements 50, 60 are each made of a metal piece and have a high acoustic impedance relative to the acoustic impedance of the fluid F such that a large part of the sound signals 22, 24 is reflected. Alternatively, the deflection elements 50, 60 are embodied e.g. as a cavity which is e.g. filled with air. Relative to the fluid F in the fluid space 5, it has a low acoustic impedance such that a large part of the sound signals 22, 24 is reflected.

By way of example, the base portion 3 of the fluid container 1 has protrusions on which the deflection elements 50, 60 rest or into which the deflection elements 50, 60 are integrated.

A program is stored, in particular in a program and data storage medium of the control apparatus, which program is explained in more detail below on the basis of the flowchart in FIG. 2.

The program is started in a step S1, in which variables are initialized.

In a step S3, the first value H1 for the level H of the fluid surface O is established and the second value H2 for the level H of the fluid surface O is established.

In a step S5, first signal scattering SS1 of the first reflected sound signals 14 and second signal scattering SS2 of the second reflected sound signals 24 are established.

In a step S7, a first signal power SL1 of the first reflected sound signals 14 and a second signal power SL2 of the second reflected sound signals 24 are established.

In a step S9, a signal quality SQ1 of the first reflected sound signals 14 is established in a manner dependent on the first signal scattering SS1 of the first reflected sound signals 14 and the first signal power SL1 of the first reflected sound signals 14 and a signal quality SQ1 of the second reflected sound signals 24 is established in a manner dependent on the second signal scattering SS1 of the second reflected sound signals 24 and the second signal power SL1 of the second reflected sound signals 24.

In a step S11, the level H of the fluid surface O in the fluid container 1 is established in a manner dependent on the first signal quality SQ1 of the first reflected sound signals 14 and in a manner dependent on the second signal quality SQ2 of the second reflected sound signals 24. By way of example, this is carried out by weighting the reflected signals 14, 24 by the respective signal quality SQ1, SQ2.

In a second exemplary embodiment (FIG. 3), the level H of the fluid surface O of the fluid F in the fluid container 1 is determined in a manner analogous to the first exemplary embodiment from FIG. 1. In this case, the second sound transducer 20 is arranged at one side of the housing wall of the fluid container 1. The alignment of the second sound transducer 20 includes a 90° angle with the first sound transducer 10 such that emitted second sound signals 22 from the second sound transducer 20 are directed parallel to the base portion 3 onto the first deflection element 50 while the first sound signals 12, 14 propagate substantially perpendicular to the base portion 3, like in the first exemplary embodiment. This is advantageous in that, in addition to the first deflection element 50, no further deflection elements are required and the second sound signals 22, 24 therefore experience weak damping.

Figure 6:
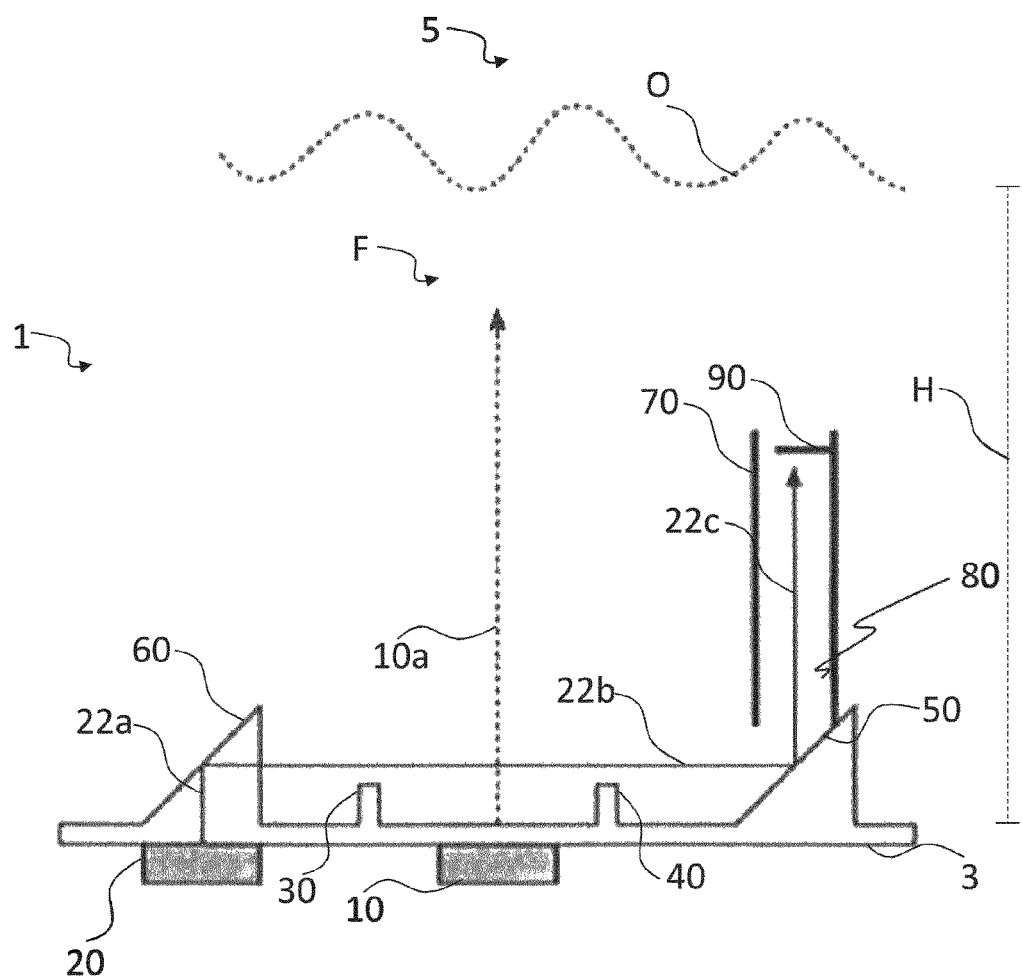
FIG. 6 shows a fifth exemplary embodiment of the apparatus for determining the level of the fluid surface in the fluid container.

FIG. 4 shows a third exemplary embodiment, comprising two deflection elements 50, 60 in accordance with the first exemplary embodiment; however, these are arranged in such a way that acoustic paths of the two sound transducers 10, 20 cross, as depicted in the second exemplary embodiment. Such an arrangement leads to a compact design of the apparatus, in which mutual influencing of the sound signals 12, 14, 22, 24 can be kept low. The arrangement of the sound measurement transducers 10, 20 in the following exemplary embodiments in FIGS. 5 and 6 corresponds to one discussed in FIG. 4.

In a fourth exemplary embodiment (FIG. 5), the level H of the fluid surface O of the fluid F in the fluid container 1 is determined in a manner analogous to the first exemplary embodiment from FIG. 1. A sound guiding tube 70 is arranged in the fluid space 5 so as to be able to determine the level H as precisely as possible, for example also in the case of an inclined position of the fluid container 1 or in the case of waviness of the fluid surface O caused by movement of the fluid container 1.

By way of example, the sound guiding tube 70 is made from the same plastic as the fluid container 1 and it is plugged on and/or locked with snap-in hooks for mechanical coupling to the fluid container 1.

The sound guiding tube 70 is embodied to guide the third stage 22c, aligned perpendicular to the base portion 3, of the emitted second sound signals 22 in the direction of the fluid surface O and to guide the perpendicularly aligned first stage 24a of the second sound signals 24, reflected by the fluid surface O, in the direction of the first deflection element 50 along a longitudinal axis of the sound guiding tube 70.

Particularly in the case where the level H of the fluid surface O is less than a length of the sound guiding tube 70, a height of the fluid surface O does not exceed an end of the sound guiding tube 70 distant from the base portion 3, the sound guiding tube 70 contributes to strong decoupling between the dynamics of the fluid surface O within the sound guiding tube 70 and the dynamics of the fluid surface O outside of the sound guiding tube 70. Determining the level H is very reliable in this case, even in the case of a very dynamic fluid surface O.

In the case where the level H of the fluid surface O is greater than the length of the sound guiding tube 70, the height of the fluid surface O exceeds the end of the sound guiding tube 70 distant from the base portion 3, e.g. neither one of the two sound transducers 10, 20 receives a sound signal 14, 24 as a result of the dynamics of the fluid surface O.

However, if it is possible to establish the speed of sound, for example because the second sound transducer 20 receives the reflected reference sound signals 24*d*, 24*e*, the assumption can be made with a high probability that the height of the fluid surface O at least exceeds the end of the sound guiding tube 70 distant from the base portion 3 since the determination of the level H in the case of low levels H is very reliable. This is of particular interest, particularly in the case where the fluid F is a reduction means, since operating a vehicle without a sufficient fill level of the reduction means is not allowed, i.e., for example, if a predetermined level H is undershot. Hence, the operation of the vehicle is also made possible if it is temporarily not possible to determine the level H, for example due to a greatly inclined position of the vehicle.

Since an absolute measurement length of the level H of the fluid surface O is e.g. 500 mm or more and since the fluid F can freeze in the case of winter temperatures, e.g. under −10° C., and the fluid container 1 is exposed to strong vibrations, the requirements on a mechanical resilience of the sound guiding tube 70 are particularly high.

In this context, a ratio of the length of the sound guiding tube 70 to a diameter of the sound guiding tube of, in particular, between 20:1 and 2:1 may reduce the above-mentioned risks.

Since the precise determination of the level H of the fluid surface O is important, particularly in the case of low levels H of the fluid surface O, for example in order to be able to identify a low fill level in good time, the length of the sound guiding tube 70 may be 60 mm. The diameter of the sound guiding tube 70 may be 10 mm.

In a fifth exemplary embodiment (FIG. 6), the level H of the fluid surface O of the fluid F in the fluid container 1 is determined in a manner analogous to the third exemplary embodiment from FIG. 4. In this case, the sound guiding tube 70 has a reflector 90 at the inner wall 80 thereof. By way of example, the reflector 90 is made from the same material as the deflection element 50, 60 or the reference element 30, 40 and it is preferably arranged at the end of the sound guiding tube 70 distant from the base portion 3 such that it has a predetermined reference distance from the base portion 3. By way of example, the reflector 90 is fixedly coupled to the inner wall 80. Alternatively, the predetermined reference distance is variably adjustable.

In the case where the level H of the fluid surface O is greater than the length of the sound guiding tube 70, the height of the fluid surface O exceeds the end of the sound guiding tube 70 distant from the base portion 3, at least the second sound transducer 20 receives a sound signal, reflected by the reflector 90, independently from the dynamics of the fluid surface O. This enables a reliable statement to be made about a minimum level of the fluid surface O.

What is claimed is:

1. An apparatus for determining a level of a fluid surface in a fluid container, the apparatus comprising:
    a first sound transducer for transmitting and receiving first sound signals toward the fluid surface;
    a second sound transducer for transmitting and receiving second sound signals;
    a reference element disposed at a predetermined distance from the second sound transducer and arranged in a fluid space of the fluid container;
    a first deflection element arranged in the fluid space to deflect the second sound signals by a first predetermined angle toward the fluid surface, and
    a processor programmed to calculate a speed of sound within a fluid in the fluid space based at least in part on a second time duration for the second sound signals to return to the second sound transducer and to establish the level of the fluid surface over a base portion of the fluid container based at least in part on a first time duration for the first sound signals to return to the first sound transducer, the second time duration, and the calculated speed of sound within the fluid.

2. The apparatus as claimed in claim 1, further comprising a second deflection element arranged in the fluid space at a second predetermined distance from the first deflection element to deflect the second sound signals by a second predetermined angle in the direction of the first deflection element.

3. The apparatus as claimed in claim 1, further comprising a sound guiding tube arranged in the fluid space and guiding the second sound signals, deflected by the first deflection element, along a longitudinal axis thereof in the direction of the fluid surface.

4. The apparatus as claimed in claim 3, wherein the length of the sound guiding tube is between 30 mm and 100 mm.

5. The apparatus as claimed in claim 3, wherein a diameter of the sound guiding tube is between 5 mm and 15 mm.

6. The apparatus as claimed in claim 3, wherein a ratio of the length of the sound guiding tube to the diameter of the sound guiding tube is between 20:1 and 2.1.

7. The apparatus as claimed in claim 3, further comprising a reflector disposed on an inner wall of the sound guiding tube and at a predetermined reference distance from the base portion.

8. The apparatus as claimed in claim 3, wherein the length of the sound guiding tube is 60 mm.

9. The apparatus as claimed in claim 8, wherein a diameter of the sound guiding tube is between 5 mm and 15 mm.

10. The apparatus as claimed in claim 8, wherein a diameter of the sound guiding tube is 10 mm.

11. The apparatus as claimed in claim 8, wherein a ratio of the length of the sound guiding tube to the diameter of the sound guiding tube is between 20:1 and 2:1.

12. The apparatus as claimed in claim 8, wherein a ratio of the length of the sound guiding tube to the diameter of the sound guiding tube is 6:1.

13. The apparatus as claimed in claim 1, wherein the level of the fluid surface above the base portion of the fluid container is established dependent on a signal quality of the first sound signals and a signal quality of the second sound signals.

14. The apparatus as claimed in claim 13, wherein the signal quality of the first sound signals and the second sound signals are established dependent on respective signal scattering of a plurality of sound signals recorded successively in time.

15. The apparatus as claimed in claim 13, wherein the signal quality of the first sound signals and the second sound signals are established dependent on the respective signal power of the recorded sound signals.

\* \* \* \* \*